US007276202B2

(12) United States Patent
Choi

(10) Patent No.: US 7,276,202 B2
(45) Date of Patent: Oct. 2, 2007

(54) METHOD OF MANUFACTURING CERAMIC BOTTLE FOR PLASTIC CORK

(76) Inventor: Kwang-Ho Choi, 291-1, Huan-ri Hobub-myun, Echoun-Si, Kyungkido 467-822 (KR)

( * ) Notice: Subject to any disclaimer, the term of this patent is extended or adjusted under 35 U.S.C. 154(b) by 0 days.

(21) Appl. No.: 10/509,640

(22) PCT Filed: Apr. 8, 2003

(86) PCT No.: PCT/KR03/00703

§ 371 (c)(1),
(2), (4) Date: Sep. 29, 2004

(87) PCT Pub. No.: WO03/089322

PCT Pub. Date: Oct. 30, 2003

(65) Prior Publication Data

US 2005/0145318 A1 Jul. 7, 2005

(30) Foreign Application Priority Data

Apr. 13, 2002 (KR) ...................... 10-2002-0020244

(51) Int. Cl.
*C03B 29/00* (2006.01)

(52) U.S. Cl. ...................... 264/610; 264/632; 264/636; 264/637; 159/89.11

(58) Field of Classification Search ............ 156/89.11; 264/603, 610, 632, 633, 651, 636, 637
See application file for complete search history.

(56) References Cited

U.S. PATENT DOCUMENTS 2,026,304 A * 12/1935 Deady ........................ 215/283
2,303,303 A * 11/1942 Schleicher .................. 264/651
4,014,448 A 3/1977 Greenberg
5,109,997 A * 5/1992 Phillips ...................... 215/360
5,733,777 A * 3/1998 Dudney ................... 435/304.1
5,947,310 A * 9/1999 Wagner ...................... 215/219
6,216,897 B1 * 4/2001 Wagner ........................ 215/44
6,536,618 B1 * 3/2003 Hwang et al. .............. 215/358
2003/0057173 A1 * 3/2003 Wagner ........................ 215/44
2003/0127420 A1 * 7/2003 Schumacher ................ 215/302

FOREIGN PATENT DOCUMENTS

| | | | |
|---|---|---|---|
| AU | 2003100175 | * | 5/2003 |
| DE | 42 36 245 | * | 5/1994 |
| EP | 225 293 | * | 6/1987 |
| JP | 61-60456 | * | 3/1986 |
| JP | 61 60456 | | 6/1994 |
| KR | 20000015596 | | 8/2000 |

* cited by examiner

*Primary Examiner*—Melvin Mayes
(74) *Attorney, Agent, or Firm*—Ladas & Parry LLP

(57) ABSTRACT

The present invention forms screw-like projection at the entrance of ceramic bottle and enables air-tightening with plastic cork, formed with screw-like projection in its body. It guarantees air tightening of ceramic bottle, and does not use imported cork, which decreases the need to import. Moreover, increases productivity by automating the air-tightening process of plastic cork. The present invention can reduce cost of production, at the same time, increasing productivity, and it can be re-used multiple times after the air-tightening.

3 Claims, 5 Drawing Sheets

METHOD OF MANUFACTURING CERAMIC BOTTLE FOR PLASTIC CORK

BACKGROUND OF THE INVENTION

1. Field of the Invention

The present invention relates to a ceramic bottle for plastic cork that forms screw-like projection at the entrance of the ceramic bottle so that the formed plastic cork blocks the entrance of the ceramic bottle with the plastic cork in which screw-like projection is formed, and to the manufacturing method of forming screw-like projection at the entrance of the ceramic bottle.

2. Description of the Prior Art

Generally, the present invention pertains to the manufacturing method used to form screw-like projection at the entrance of ceramic bottle and on the ceramic for plastic cork so that they can block the entrance of ceramic bottle with the plastic cork, formed with screw-like projection by forming screw-like projection at the entrance of ceramic bottle.

To manufacture existing ceramic bottle, division into the left and right should take place as shown on FIG. 1 or FIG. 2, and the inner side needs to combine with the plastic framework (2) (3), produced in the same way at the exterior of the ceramic bottle (1). Moreover, combination with the upper part of the aforementioned plaster framework (2) (3) should take place.

Funnel-shaped plaster framework (5) where funnel-shaped main entrance (4) is formed shall be included to assemble funnel-shaped plaster framework (5) at the upper part at a state when plaster framework (2) (3) is assembled. Then, slip shall be filled at the inner side of the plaster framework (2) (3) with aforementioned main entrance (4). After specified time lapses by, ceramic bottle (1) is formed inside the plaster framework (2) (3) with specific, consistent thickness. When the thickness of the aforementioned ceramic bottle (1) forms into a desired thickness, then the entire framework is turned over to discharge slip filled within the plaster framework (2) (3). After specific period of time is lapsed by, funnel-shaped plaster framework (5) and plaster framework (2) (3) are removed to undergo plasticity process for ceramic bottle (1). Accordingly, slip casting method that produces ceramic bottle (1) with utility value is used.

Ceramic bottle (1), produced by aforementioned slip casting method, contains a smoothly formed inner side of the entrance (6). Therefore, cork (7) is used to block the aforementioned entrance (6).

Cork (7) is highly porous and tends to break easily since it is made of natural tree covering, and shall be used by attaching covering (8) made of ceramic or plastic. However, there are unsanitary aspects since the process of attaching the cork (7) onto the covering (8) is complex and difficult.

Moreover, when cork (7) is used, air-tightness lags behind due to the nature of the cork. Moreover, beautifying of the exterior is very difficult, and the re-use of cork (7) used once is difficult since the cork is contracted.

SUMMARY OF THE INVENTION

The present invention pertains to the manufacturing method used to form screw-like projection at the entrance of ceramic bottle and on the ceramic for plastic cork so that they can block the entrance of ceramic bottle with the plastic cork, formed with screw-like projection by forming screw-like projection at the entrance of ceramic bottle. To manufacture existing ceramic bottle, division into the left and right should take place as shown on FIG. 1 or FIG. 2, and the inner side needs to combine with the plastic framework (2) (3), produced in the same way at the exterior of the ceramic bottle (1). Moreover, combination with the upper part of the aforementioned plaster framework (2) (3) should take place. Funnel-shaped plaster framework (5) where funnel-shaped main entrance (4) is formed shall be included to assemble funnel-shaped plaster framework (5) at the upper part at a state when plaster framework (2) (3) is assembled. Then, slip shall be filled at the inner side of the plaster framework (2) (3) with aforementioned main entrance (4). After specified time lapses by, ceramic bottle (1) is formed inside the plaster framework (2) (3) with specific, consistent thickness. When the thickness of the aforementioned ceramic bottle (1) forms into a desired thickness, then the entire framework is turned over to discharge slip filled within the plaster framework (2) (3). After specific period of time is lapsed by, funnel-shaped plaster framework (5) and plaster framework (2) (3) are removed to undergo plasticity process for ceramic bottle (1). Accordingly, slip casting method that produces ceramic bottle (1) with utility value is used.

Ceramic bottle (1), produced by aforementioned slip casting method, contains a smoothly formed inner side of the entrance (6). Therefore, cork (7) is used to block the aforementioned entrance (6).

Cork (7) is highly porous and tends to break easily since it is made of natural tree covering, and shall be used by attaching covering (8) made of ceramic or plastic. However, there are unsanitary aspects since the process of attaching the cork (7) onto the covering (8) is complex and difficult.

Moreover, when cork (7) is used, air-tightness lags-behind due to the nature of the cork. Moreover, beautifying of the exterior is very difficult, and the re-use of cork (7) used once is difficult since the cork is contracted.

BRIEF DESCRIPTION OF THE DRAWINGS

The aforementioned aspects and other features of the present invention will be explained in the following description, taken in conjunction with the accompanying drawings, wherein.

Figure 1:
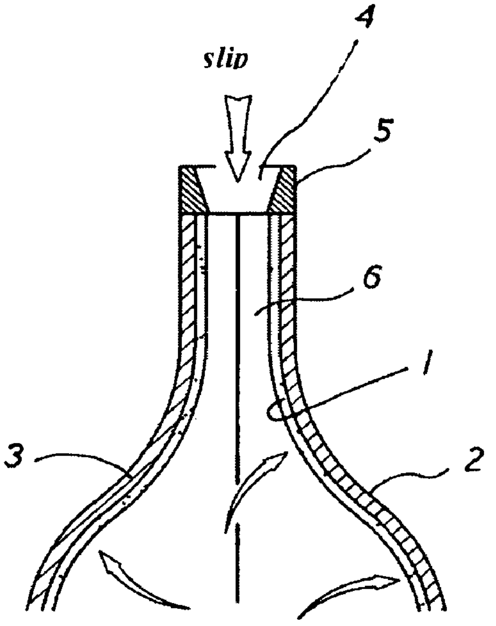
FIG. 1 ( PRIOR ART)
FIG. 1: sectional view that explains manufacturing of existing ceramic bottle
Figure 2:
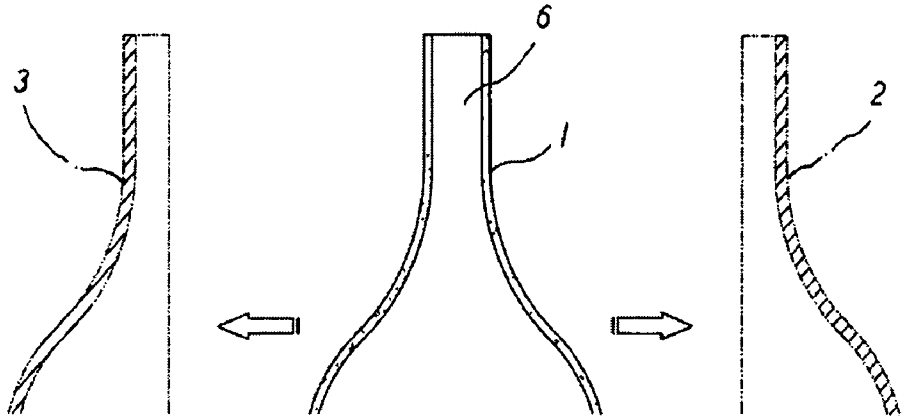
FIG. 2 ( PRIOR ART)
FIG. 2: diagram on the forming state of existing ceramic bottle
Figure 3:
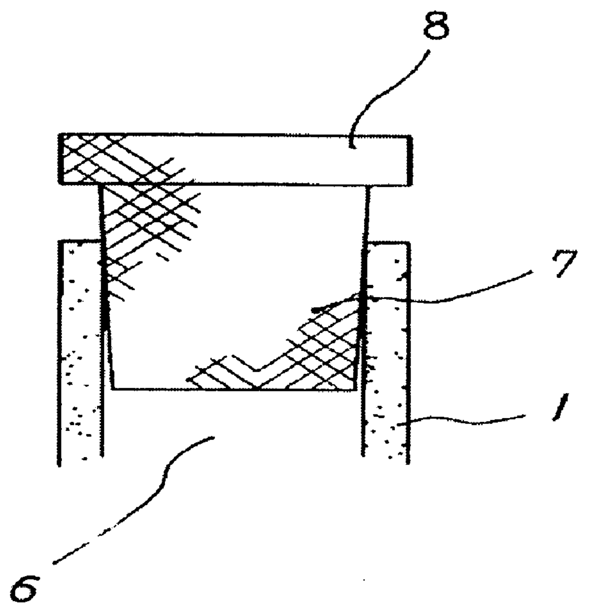
FIG. 3 ( PRIOR ART)
FIG. 3: sectional view on the status of existing ceramic bottle cork's blockage
Figure 4:
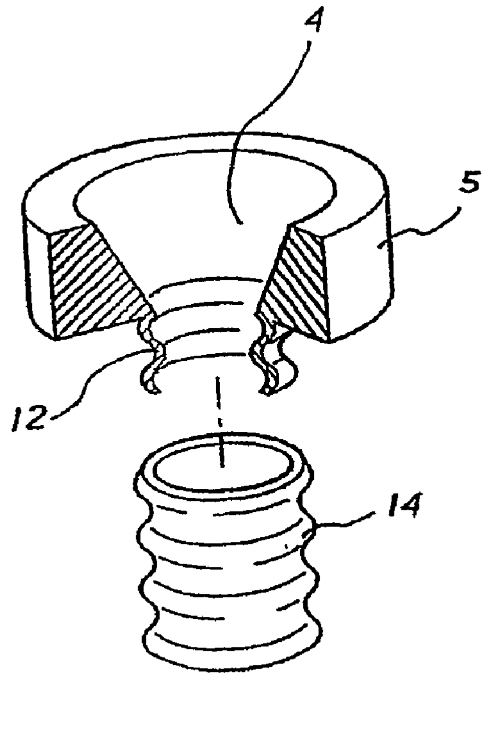
FIG. 4: diagram of the present invention's funnel-shaped plaster framework
Figure 5:
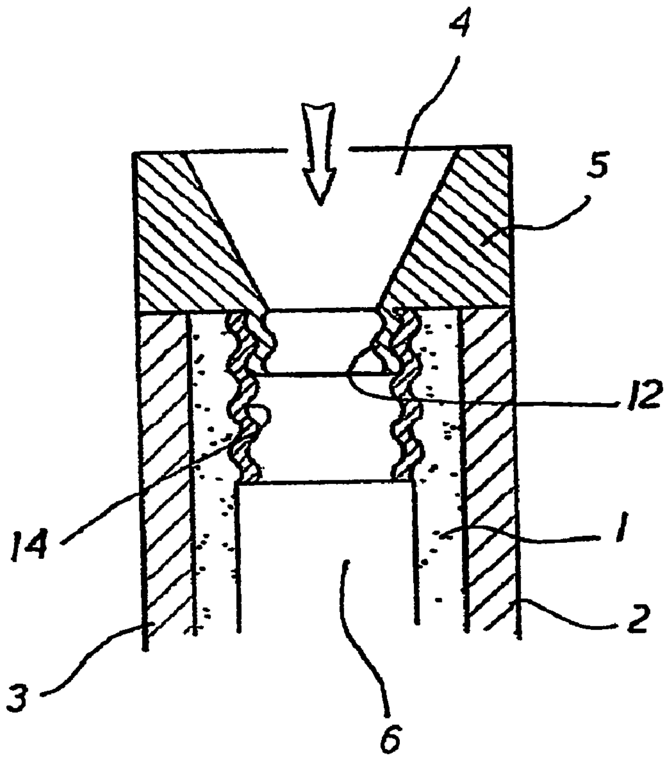
FIG. 5: sectional view of funnel-shaped plaster framework's state of assembly pertaining to the present invention
Figure 6:
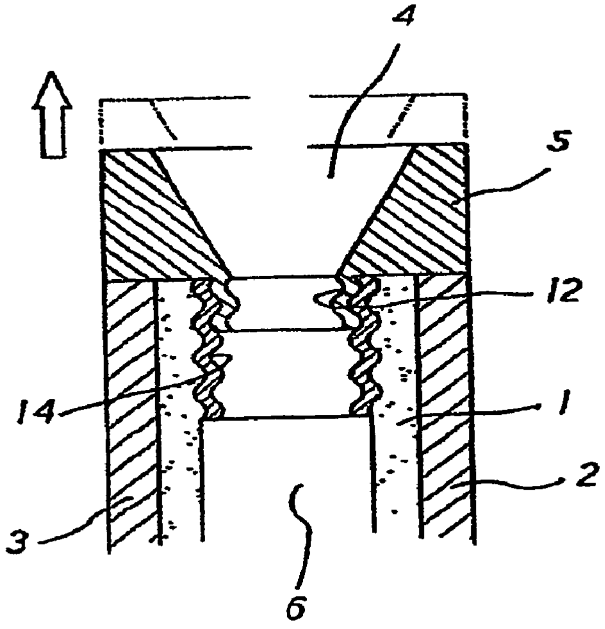
FIG. 6: sectional view on the state of separating screw pipe from the present invention's funnel-shaped plaster framework
Figure 7:
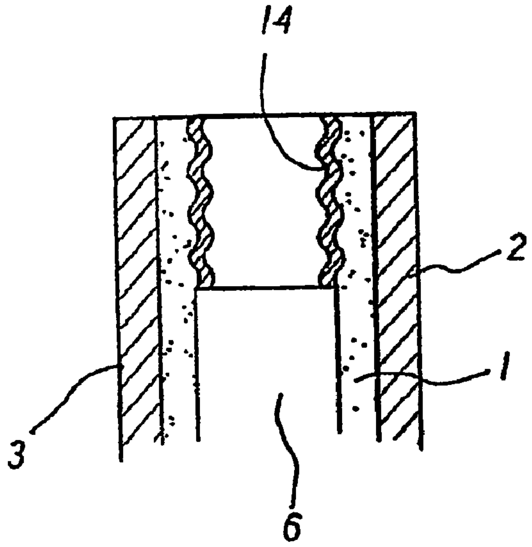
FIG. 7: sectional view of a state in which the present invention's screw pipe is inserted
Figure 8:
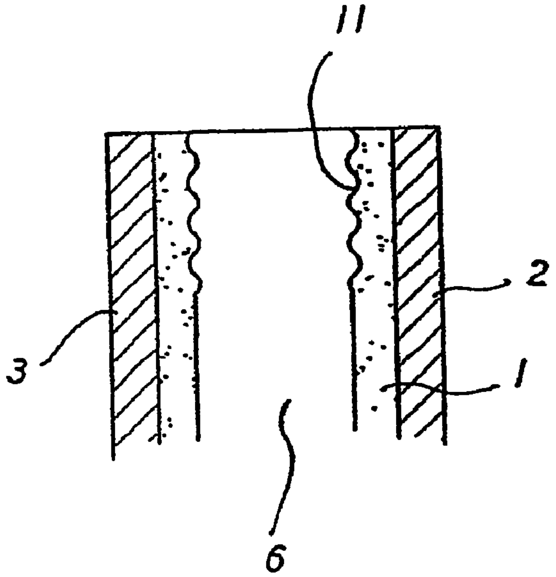
FIG. 8: sectional view of a state in which screw pipe is incinerated from the present invention's ceramic bottle
Figure 9:
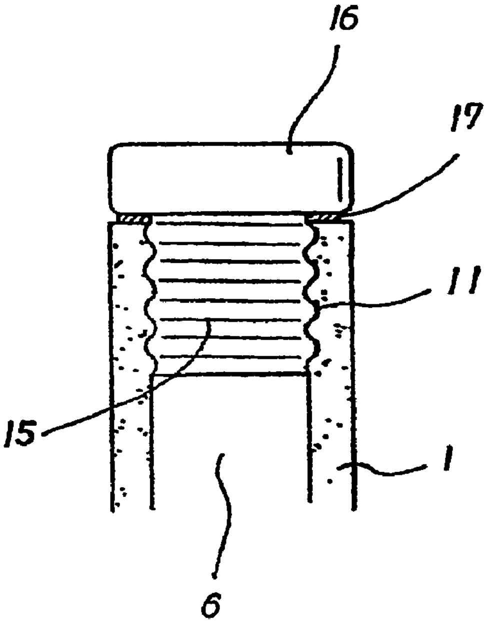
FIG. 9: sectional view on a state in which the present invention's plastic cork is blocked
Figure 10:
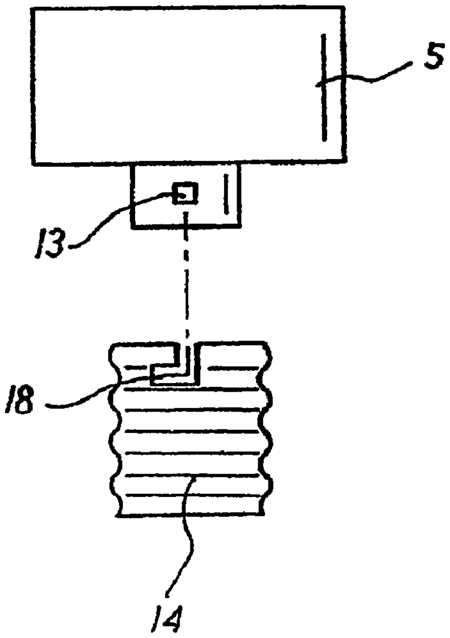
FIG. 10: frontal view on the example of executing medium for combination for the present invention

| [Explanation of Symbols on the Figure's Key Parts] | |
|---|---|
| 1: | ceramic bottle |
| 2, 3: | plaster framework |
| 5: | funnel-shaped plaster framework |
| 6: | entrance |
| 11, 15: | screw-like projection |
| 14: | screw pipe |
| 16: | plastic cork |

DETAILED DESCRIPTION OF PREFERRED EMBODIMENTS

The present invention will be described in detail by way of a preferred embodiment with reference to accompanying drawings.

The present invention forms screw-like projection towards the inner side of the ceramic bottle at the time of ceramic bottle production. When it pertains to plastic cork, screw-like projection is formed towards the outer side so that plastic cork can be used to air-tight the entrance of the ceramic bottle.

The present invention results from the following process; installation of medium for combination at the lower part of funnel-shaped plaster framework's main entrance; installation of screw pipe where screw-like projection is formed, onto aforementioned medium for combination; then production of ceramic bottle so that aforementioned screw pipe is situated at the entrance of ceramic bottle; undergo plasticity process while screw pipe is inserted onto produced entrance of ceramic bottle so that screw-like projection is formed from the inner side of ceramic bottle's entrance. The present invention enables the air-tightening of ceramic bottle's entrance with plastic cork by using screw-like projection.

The present invention formed screw-like projection (11) at the entrance (6) of ceramic bottle (1), produced with slip casting method so that plastic cork (16), formed with screw-like projection (15), can air-tight the entrance (6) of the ceramic bottle (1) by using the formed plastic cork (16) in the form of tightening the screw.

screw-like projection (11) is formed at the inner side of entrance (6) of the present invention's ceramic bottle (1), and screw-like projection (15) is formed on the cork (16) that blocks the entrance (6) of the aforementioned ceramic bottle (1) to block the entrance (6) of the ceramic bottle (1) by using plastic cork (16) through the combination of screw-like projection (11) (15).

Here, screw-like projection (11), formed on ceramic bottle (1), and the screw-like projection (15) of the plastic cork (16) are combined or such combination is removed when they are turned. Air-tightening is realized when plastic cork (16) is blocked. When the air-tightening of ceramic bottle (1) and plastic cork (16) is doubtful, and then install silicon packing (17) at the lower part of the plastic cork (16) so that silicon packing (17) is situated between the ceramic bottle (1) and plastic cork (16) to ensure impeccable air-tightening.

The production method of ceramic for plastic cork for the present invention is comprised of the following processes; process of combining screw pipe (14), installed at the lower part of the funnel-shaped plaster framework (5)'s main entrance (4) with screw pipe (14); process of inserting slip by placing funnel-shaped plaster framework (5), combined with aforementioned screw pipe (14), on the upper part of the plaster framework (2) (3); process of pouring slip when the thickness of ceramic bottle (1) is formed between the plaster framework (2) (3) and screw pipe (14); process of separating plaster framework (2) (3) and funnel-shaped plaster framework (5) when aforementioned ceramic bottle (1) hardens so that screw pipe (14) is inserted into the entrance (6) of the ceramic bottle (1); and the process of forming screw-like projection (11) at the entrance (6) of the ceramic bottle (1) by undergoing plasticity process for the ceramic bottle (1) where screw pipe (14) is inserted.

When it pertains to funnel-shaped plaster framework (5), funnel-shaped main entrance (4) is formed at the inside, and installation of medium for combination takes place at the lower part of the aforementioned main entrance (4). Formation of aforementioned medium for combination is based on the combination pipe (12) or combination projection (12). When combination pipe (12) is installed at the funnel-shaped plaster framework (5), screw pipe (14) is combined by being externally inserted into the combination pipe (12), and when combination projection (13) is installed into funnel-shaped plaster framework (5), the combination takes place by being inserted into the combination groove (18), formed on screw pipe (14).

The present invention's medium for combination may take place by using other mediums besides the aforementioned combination pipe (12) or combination projection (13), but these shall include a structure whereby screw pipe (14) can be attached.

The present invention's screw pipe (14) is made with materials such as plastic, resin and starch that can be destroyed by fire when heat is exerted. Screw pipe (14) shall be destroyed by fire during the process of incineration for ceramic bottle (1).

The following is the production method for the ceramic bottle (1) of the present invention.

First of all, the process of assembling plaster framework (2) (3) is comparable to that of existing slip casting. In the present invention, medium for combination is installed at the lower part of the funnel-shaped plaster framework (5) to combine with screw pipe (14).

When combination pipe (12) is formed at the lower part of the funnel-shaped plaster framework (5), combine by circulating with screw pipe (14) attached on. When combination projection (13) is formed at the lower part of the funnel-shaped plaster framework (5), then combine by circulating after inserting into the combination groove (18) of the screw pipe (14).

When screw pipe (14) is combined with the lower part of the funnel-shaped plaster framework (5) using medium for combination, install funnel-shaped plaster framework (5) in a way so that the aforementioned screw pipe (14) is situated at the inside of plaster framework (2) (3). Then, insert slip into the inner part of the plaster framework (2) (3) through the main entrance (4) of the aforementioned funnel-shaped plaster framework (5).

When slip is filled inside the plaster framework (2) (3) and funnel-shaped plaster framework (5), then ceramic bottle (1) of specific thickness shall be formed after specific time lapses by. When the time needed for the formation of desired ceramic bottle (1)'s thickness at the interior of the plaster framework (2) (3) lapses by, discharge slip, filled in the plaster framework (2) (3) by lifting plaster framework (2) (3) up side down.

When the slip, filled in the plaster framework (2) (3), is discharged, then return plaster framework (2) (3) into its original position. Then, remove funnel-shaped plaster framework (5)'s medium for combination to separate screw pipe (14), and lift out funnel-shaped plaster framework (5) to separate into plaster framework (2) (3) again.

Then, ceramic bottle (1) is formed at a state whereby screw pipe (14) is inserted into the entrance (6), which leads to the birth of complete ceramic bottle (1) after going through the drying and plasticity processes.

Plasticity process is undergone at a state whereby screw pipe (14) is inserted into the entrance (6) of aforementioned ceramic bottle so that screw pipe (14) maybe completed destroyed by fire during the above mentioned process due to heat.

Then, screw-like projection (11) is formed at the entrance (6) of ceramic bottle (1), which coincides with the external view of the screw pipe (14), and which in turn is produced at a specific, consistent measurement since screw pipe (14) is produced in a consistent manner.

When the ceramic bottle (1), formed with screw-like projection (11) at the entrance (6), completed, the screw-like projection (15) is formed on the plastic cork (16) to ensure combination among screw-like projections (11) (15). Therefore, entrance (6) of ceramic bottle (1) is blocked with plastic cork (16).

Here, air-tightening of ceramic bottle (1) with plastic cork (16) is made impeccable. However, when doubtful, use silicon packing (17) to air-tight with plastic cork (16) from the upper part of the ceramic bottle (1) to ensure a more complete air-tightening. As mentioned above, the ability to tighten the entrance (6) of ceramic bottle (1) by using plastic cork (16) in a form of screwing in by forming screw-like projection (11) is not limited to the ceramic bottle (1). Application can be made on the ceramic container with wide entrance and other products such as ceramic container and related products.

What is claimed is:

1. A method of manufacturing a ceramic bottle sealed by a plastic cork, the ceramic bottle manufacturing method comprising the steps of:

combining a screw pipe (14) with a combining medium formed at the lower part of a main entrance (4) of a funnel-shaped plaster framework (5);

placing the funnel-shaped plaster framework (5) combined with the screw pipe (14), onto the upper part of plaster frameworks (2)(3), and then injecting slip into the frameworks (5)(2)(3);

pouring the slip after the thickness of the ceramic bottle (1) has been formed between the plaster frameworks (2)(3) and the screw pipe (14);

separating the funnel shaped plaster frameworks (5) from the plaster frameworks (2) (3) and then maintaining the screw pipe (14) at the state where the screw pipe has been combined with the entrance (6) of the ceramic bottle (1); and undergoing a plasticity process for the ceramic bottle (1) at the state where the screw pipe (14) has been combined with the entrance (6) of the ceramic bottle (1), thereby incinerating the screw pipe (14) and forming a screw injection (11) on the inner side of the entrance (6) of the ceramic bottle (1), so that the plastic cork having a screw portion can be engaged with the screw projection (11); wherein the combining medium comprises a combination pipe (12) or a combination projection (13) that is combined with and separated from the screw pipe (14).

2. The ceramic bottle manufacturing method according to claim 1, wherein the screw pipe (14) is made of plastic, resin or starch that is incinerated during the plasticity process of the ceramic bottle (1).

3. The ceramic bottle manufacturing method according to claim 1, wherein a silicon packing (17) is provided at the lower part of the plastic cork (16) to thereby guarantee air-tightening between the ceramic bottle (1) and the plastic cork (16).

* * * * *